Nov. 21, 1939.    J. K. OSTRANDER    2,180,432
WATER HEATER CONTROL SYSTEM
Filed Aug. 26, 1936    2 Sheets-Sheet 1

INVENTOR
John K. Ostrander.
BY
ATTORNEY

Nov. 21, 1939. J. K. OSTRANDER 2,180,432
WATER HEATER CONTROL SYSTEM
Filed Aug. 26, 1936 2 Sheets-Sheet 2
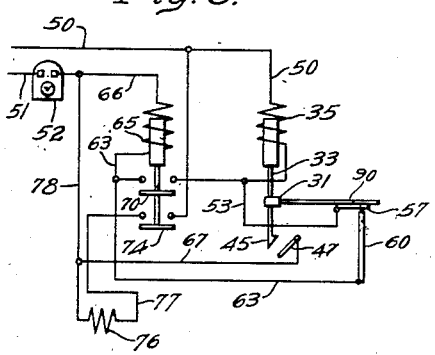
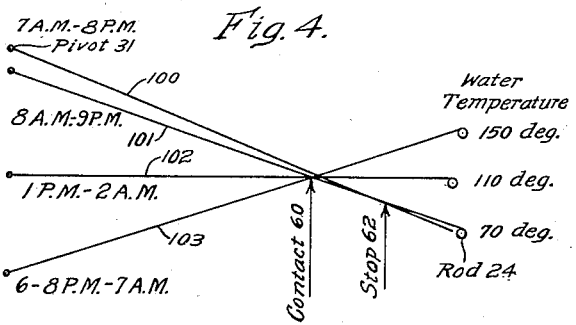
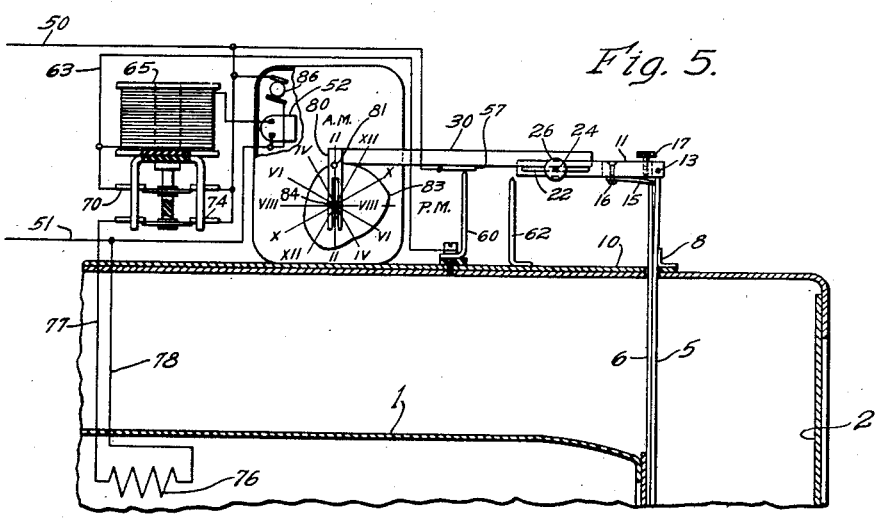
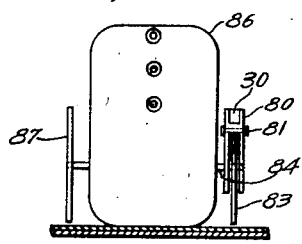
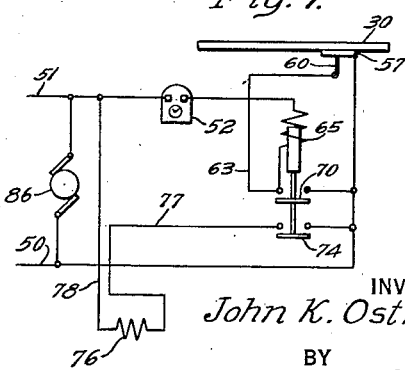
WITNESSES:
INVENTOR
John K. Ostrander.
BY
ATTORNEY Patented Nov. 21, 1939

2,180,432

UNITED STATES PATENT OFFICE 2,180,432

WATER HEATER CONTROL SYSTEM

John K. Ostrander, Philadelphia, Pa.

Application August 26, 1936, Serial No. 98,101

14 Claims. (Cl. 236—46)

This invention relates to control systems for hot water heaters and particularly to those involving both temperature-responsive apparatus and time-controlled apparatus.

It is an object of this invention to provide a system in which the power for the heating of the water shall be drawn from the power supply at a time when other demands upon the power supply are small.

It is a further object of this invention to provide for adding the water heaters to the power load at times scattered through a period instead of adding all of them at once.

It is a further object of this invention to apportion the time during which power will be supplied to any one heating unit in accordance with the temperature of the water in that unit, whereby the water that is already hot will receive power during only a short time and the water which is cooler will receive power over a greater period.

It is a further object of this invention to so regulate the supply of power to the several hot water units that all of the units will have the water at the maximum temperature at the same predetermined time of day.

It is a further object of this invention to begin supplying power to the several water heaters at a period determined by the temperature of the water after a predetermined time of day (such as 9 P. M.) and to do so in a system in which all the heaters are shut off at the same later time (such as 7 A. M.), whereby the period over which power will be supplied will be longer in the case of cooler water and briefer when the water is more nearly at the desired temperature.

It is a further object of this invention to provide, in a system involving a power supply and a plurality of water heating units, and in which the power is shut off from all water heating units at once at a fixed time of day, a control arrangement by which power will be turned on to any one unit long enough before said fixed time of day to bring the water therein to a predetermined maximum temperature by said fixed time of day and will not be turned on to said unit sooner.

As a result of this object of the invention the time during which any unit is receiving heat is reduced and the time during which the water is at a high temperature is minimized. As a consequence of this the loss of heat by radiation is also minimized.

It is a further object of the invention to provide a system of water heating units in which each unit is connected to the power supply at the moment which will leave only time enough for the water to be heated to the standard maximum temperature when the predetermined time of day is reached at which time all the units are disconnected from the power supply. It is a result of this object of the invention that the water is maintained at a high temperature during a shorter time than with systems heretofore used.

Other objects of this invention and details of its present preferred construction will be apparent from the following description and the accompanying drawings, in which:

Fig. 3 is a circuit diagram showing the connections used with the apparatus of Fig. 1;

Fig. 4 is a diagram showing the various positions of the control lever under different circumstances;

Fig. 5 is a semi-diagrammatic view similar to Fig. 1 showing a modification;

Fig. 6 is an edge elevation of the time control portion of the apparatus illustrated in Fig. 5; and Fig. 7 is a circuit diagram illustrating the connections used in the modification shown in Fig. 5.

Figure 1:
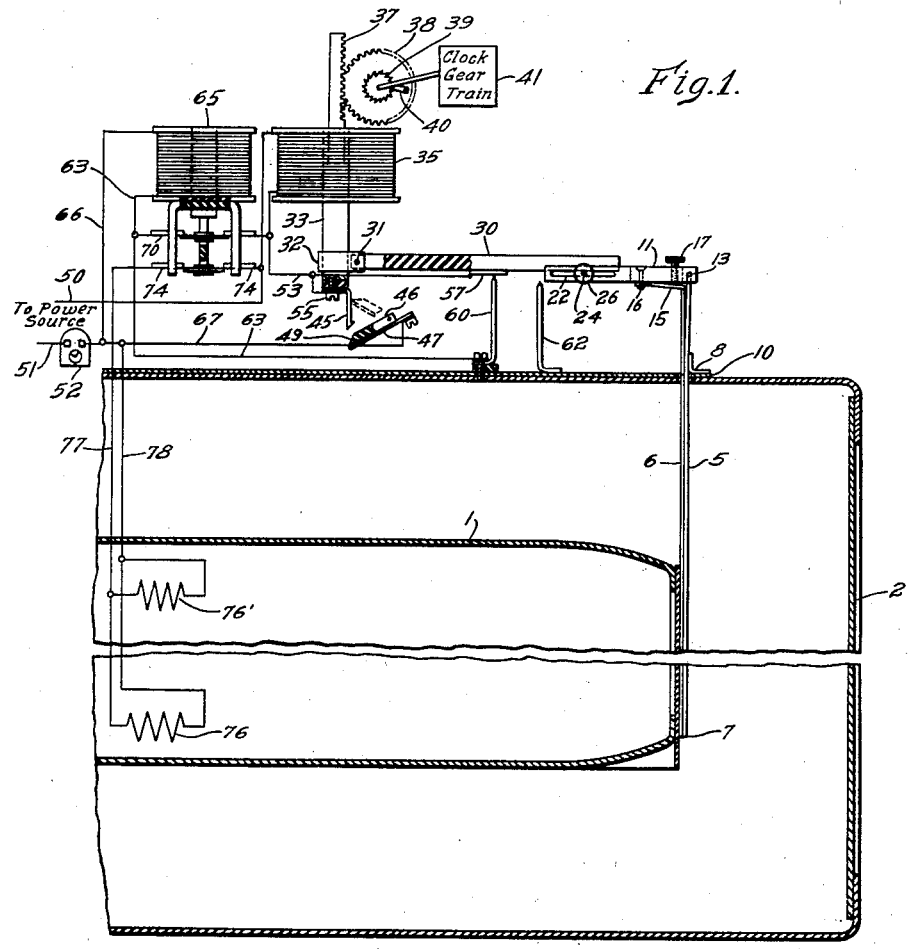
Figure 1 is a semi-diagrammatic view of one form of my apparatus.

In Figure 1, a tank 1 for holding water is surrounded by a casing 2 and the space between them is filled, as is customary, with heat insulation, not shown. In close proximity to the wall of the tank 1 are two vertical strips of different metal. The outer one 5 has a small thermal coefficient of expansion and the inner one 6 has a higher thermal coefficient of expansion. The strips 5 and 6 are secured to each other at 7, but are not attached to the tank. Any desired device for keeping them in close proximity to the wall of the tank may be used provided they are left free, except at the end, for relative movement between themselves. At the top of the casing 2, the strip 5 is secured by a bracket 8 which may be welded to a foundation plate 10. A lever 11 is located above the foundation plate 10 and its right-hand end carries a shaft 13 to which the upper end of the strip 5 is secured. The strip 5 may be pivotally attached to the shaft 13 or the shaft 13 may be pivoted in the lever 11.

The upper end of the strip 6 contacts one end of a spring 15 which is secured at its other end to the lever 11 by a rivet 16 or any other suitable fastening. The distance between the end of the strip 6 and the lever 11 is adjusted by a screw 17 which acts upon the spring 15.

Figure 2:
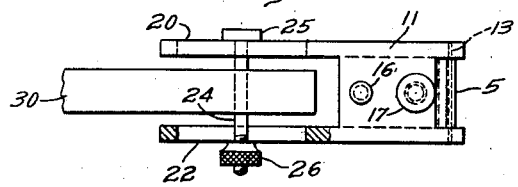
Fig. 2 is a detail view showing in top plan a portion of the apparatus.

The end of the lever 11 farthest from the strips 5 and 6 is bifurcated as shown at 20, Fig. 2, and the bifurcations are provided with slots 22 through which a rod 24 is passed. A head 25 at one end of the rod 24 and a milled nut 26 threaded upon the other end enable it to be clamped in any position along the slots 22. Its distance from the strips 5 and 6 can thus be adjusted.

A bar of insulating material 30 rests near one end upon the cross rod 24 and at its other end the bar 30 is secured by a pivot 31 to a band 32 which fixedly embraces the core 33 of a solenoid 35. The upper end of the core 33 carries a rack 37 which meshes with a gear 38. Upon the same shaft with gear 38 is a ratchet wheel 39 which cooperates with a pawl 40 on the gear 38. The wheel 38 is loose upon the shaft but the ratchet wheel 39 is rigid with the shaft. A time delay mechanism, which may be an escapement, a fan, or any other device for insuring that the ratchet wheel 39 will turn only at a predetermined speed, is driven by ratchet wheel 39 through the shaft by the weight of the core 33. The speed controlling mechanism preferably is not directly upon the shaft but is connected thereto by any suitable gearing, whereby a rapid movement of the escapement or other speed-controlling device is correlated to a slow descent of the core 33. The timing device is easily controlled because it is rapidly moving. Thus a dependable control over the time occupied by the descent of the core is obtained.

At the lower end of the core 33 a hook 45 is provided. A pivoted device 46 including an insulation coating and a metallic face 47 is in position to be engaged by the hook 45 when it has descended to its lowest position. In this descent, the hooked end of the hook 45 slips over the beveled end surface 49 of the insulation and comes into engagement with the metallic face 47. Upon the upward movement of the core 33, the parts 46 and 47 are lifted into the position shown in dotted lines and when lifted far enough, the hook 45 slips off, permitting the return of the device 46 to the position illustrated in full lines. This separation of hooked contact 45 from the metal face 47 occurs when the core 33 has reached the upper limit of its movement.

The conductors 50 and 51 conduct the power to the heater unit. The conductor 51 includes a switch controlled by a clock 52 by which the supply circuit is closed at selected times of the day. The conductor 50 extends to the upper end of solenoid 35, in accordance with a familiar practice. From the lower end thereof, a conductor 53 extends to the hook 45 to which it is secured in any desirable way, for example, by binding screws such as are shown at 55.

From the hook 45, the conductor 53 extends to a contact plate 57 upon the under side of the bar 30. An upright 60 supported by, but insulated from the foundation plate 10 ends in a pointed contact cooperating with the contact plate 57. A similar upright 62 is supported from the plate 10 somewhat nearer the strips 5 and 6 than the pointed upright 60 and it extends to a slightly lower level than the contact 60.

The contact 60 is connected by a conductor 63 to the lower terminal of the winding of a magnet 65 and a conductor 66 connects the other terminal of the winding of magnet 65 to the power supply conductor 51 upon that side of the clock switch 52 which is toward the unit. The conductor 51 extends from its junction with conductor 66 over wire 67 to the plate 47 of device 46.

The solenoid 35 is preferably of high impedance but the magnet 65 is of much higher impedance.

The conductor 63 is connected to conductor 53 by contacts 70 controlled by magnet 65. A second pair of contacts 74 also controlled by the magnet 65 control a connection between wire 50 and the wire 77 which leads to the heating coil 76 in the tank 1. The return conductor 78 from the heating coil 76 is connected to the wire 67. A similar heater 76' may be located near the top of the tank and connected to wires 77 and 78 in parallel with heater 76 if desired.

In the modification shown in Fig. 5, the end of the bar 30 remote from the lever 11 is not connected to the core of a solenoid, but goes to a fork 80 carrying a pin 81 which rides upon the edge of a cam 83. The connection of bar 30 to the top of fork 80 is preferably rigid. The fork 80 is astride the cam 83 and its tines are each divided, each tine having a part on each side of one end of the motor-driven shaft 84 on which the cam is mounted. The divided tines then constitute a guide preventing horizontal movement of rod 30. Horizontal movement of the shaft 84 is prevented by its mounting in the motor 86 and bracket 87, Fig. 6.

The motor 86 is connected across the line separately from the relay 65 and is independent of the contacts controlled by said relay 65. The details of the connections in both forms of the device will be more readily apparent from the description of the operation. Further description of the connections is reserved for this reason.

In the operation of the form shown in Fig. 1, the clock 52, at the time for which it has been set, closes a circuit most clearly shown in Fig. 3. For the sake of clearness, in the following description, various times and temperatures are given assumed values. It is assumed that the closure of the contacts by the clock 52 is set to occur at 9 o'clock P. M. and that the clock holds the contacts closed until 7 A. M. Thus, during this period, the power supply is made continuously available for use in the heater but at all other times (except as hereinafter discussed) the power supply is cut off regardless of the operation of any other part of the regulator. The circuit extends from the wire 51 and contacts of clock 52 and wire 67 to the contact 47 and, if the plunger 33 is not at the top of its movement or descending, the circuit is to the contact 45 and from thence over the wire 53 to the winding of the solenoid 35 and so to the other main 50. The solenoid 35 is thus energized and the core 33 is lifted, lifting the pivot 31 at one end of the bar 30.

If, when core 33 is at the top of its stroke the water is not too hot, the lever 11 will be low and the bar 30 will rest on the upright 62. When the plunger 33 arrives near the top of its stroke, the contacts 45 and 47 are separated. No matter how cold the water, and thus how low the lever 11, contact plate 57 cannot reach contact point 60. If the water is above a certain temperature, say 70°, lever 11 will have lifted rod 24 and so lifted bar 30. Contact 57 is thus farther from the contact 60. Contacts 45 and 47 being separated by the up stroke of plunger 33 and the contacts 57 and 60 not yet being closed, the solenoid 35 is deenergized.

The core 33, therefore, begins to descend. Its descent will be controlled by the clock device 41 and will not reach a position where any contacts are closed thereby until the lapse of some time. This time is controlled by the time device 41. In the operation assumed, it is eleven hours (or 8

A. M.) before contacts 45—47 are closed, but any time found convenient may be obtained by the adjustment of the rate of time device 41.

The position of the bar 30 at the time that the solenoid 35 first completed its upward movement is illustrated by the line 100 in Fig. 4. The temperature mark near the lower end of this line in Fig. 4 is intended to designate the line 101. No minimum temperature would have significance for line 100 because the stop 62 prevents the bar 30 bringing plate 57 into contact with the point of upright 60, no matter how low the cross rod 24 travels after bar 30 touches the stop 62. Further downward movement of cross rod 24 merely separates it from the bar 30. If the water were hotter than 70° assumed, the rod 24 would be higher and, therefore, the bar 30 might be higher. The only effect of this would be to move plate 57 farther from contact 60 from which it is already separated.

As the core 33 descends, the pivot 31 lowers its end of the bar 30. During the time that the heating coil is deenergized, there is no way for the water to become warmer and therefore no way that the cross rod 24 will rise and come into contact with bar 30. Under the assumed conditions this is without effect at this time, although with slightly different conditions the cross rod 24 may undergo a different action. The bar 30 thus arrives after a time, which has been assumed to be an hour, at the position illustrated by the line 101 in Fig. 4, in which position although the bar still touches the stop 62, the plate 57 now touches the contact 60. If the water be colder than the assumed 70°, the bar 30 will not have a different position. The cross rod 24 will be lower but the bar is stopped by the upright 62. Because contact 57 now touches contact 60, magnet 65 is energized and the heater will be started as described below. If the water be hotter than assumed, the cross rod 24 and so the bar 30 and the contact 57, will be higher and heating will not be started.

After the contact 57 has touched the top of the standard 60, the rate of descent of pivot 31 becomes proportional to the rate of rise of the other end of the bar 30 because the water has started to heat and the movement of each end of bar 30 is consequently proportional to elapsed time.

When the regulator is first put into service, the following permanent adjustments must be made which are not a part of the regular operating performance of the regulator: To keep the cross rod 24 in contact with rod 30 without causing separation of contacts 57 and 60, the rise in temperature of the water must bear the same ratio to the descent of pivot 31 as the distance of the rod 24 from contact 57 bears to the distance of the pivot 31 from the same contact 57. If the water heats too rapidly for this, the rod 24 should be moved toward the adjacent end of the bar 30, that is, toward the right-hand end as illustrated. When the position is correct, the effect of the descending core 33 upon the position of bar 30 is closely followed by the rise of rod 24. Thus with correct adjustment, rod 24 is always close to bar 30 and a very small increase in the rate of heating will lift contact 57 off contact 60 while a small diminution in the rate of heating will cause contact 57 to again touch contact 60.

With such permanent adjustment contacts 57 and 60 will just touch from the time they are first brought together until the end of the elapsed time period (as, for example, 7 A. M.). During this interval of time the water will have a definite temperature for each instant of time and at 7 A. M. its temperature will always be the same (for example, 150°) regardless of when contacts 57 and 60 are brought together. In effect the right end of the bar 30 remains stationary, except as moved by changes in water temperature, until contacts 57 and 60 are brought together. Then the right end of bar 30 starts to move up and pull these contacts apart at the same rate that the left-hand end of the bar pushes them together. Therefore, contacts 57 and 60 remain fixed in position after they have first touched, and time of day and water temperature thus become correlated. The desired result of making the heating period always end at the same time of day and start at a time dependent upon initial water temperature is thus accomplished. Until contacts 57 and 60 have been brought together and the heating cycle consequently started, their relative spacing or separation is not under control and their separation may be any distance (within the limits of the apparatus) at any given time depending upon what the water temperature happens to be at that time. After contacts 57 and 60 touch, the heating cycle continues until the water temperature reaches, say, 150 degrees, regardless of whether the contacts remain together or not, because relay contacts 70 and 74 are held shut until current through coil 65 is finally interrupted by the clock 52.

Assuming the position is as shown and the contacts 57 and 60 are closed, a circuit is established through the clock contacts in wire 51 over wire 66 and the magnet 65 and through the wire 63 to the contact 60 and so to the contact 57 and over the wire 53 and the winding of the solenoid 35 to the wire 50. At this time, the contacts 45 and 47 are open and the magnet 65 is not shunted thereby. Consequently, the circuit just traced energizes the magnet 65 and causes the contacts 70 and 74 to close. Including the magnet 65 in circuit in series with the solenoid 35 reduces the lift of the solenoid upon the core 33 but this is without effect since at this time the core is not being lifted but is descending and its motion is controlled solely by the time device 41. The closure of the contacts 70 establishes a circuit from wire 50 through solenoid 35, contacts 70, magnet 65 and the contacts of the clock 52 to the main 51. The magnet 65, therefore, remains energized as long as clock 52 does not open its contacts, even though the contacts 57 and 60 separate.

The closure of contacts 74 establishes a circuit from main 50 over contacts 74 and wire 77 to heater coil 76 and then over wire 78 and the contacts of clock 52 to the main 51. The heater coil 76 then begins to heat the water and the strips 5 and 6 are thereby heated.

The strip 5 expands slightly and being stationary at the bracket 8, its lower end descends a little. The attached end of strip 6 is thus made a little lower, but the strip 6 expands more than strip 5 and the resultant motion lifts the spring 15 and the cross rod 24 is raised.

It will be noted that contacts 70 are in parallel with the contacts 57—60. Consequently, although the heating starts and the rod 24 is lifted, the circuit of magnet 65 is not interrupted and there is no sparking at contacts 57—60.

The pivot 31 descending and the rod 24 ascending give a differential motion to the intervening point of the rod 30 which carries the contact 57. By previously adjusting the screw 17, the height of cross rod 24 above the top of strip 6 was adjusted and this regulated the temperature of the water which will cause contact 57 to touch contact 60 at a predetermined height of the other end of bar 30.

The heating of the water is at a practically uniform time-rate and the rise of the rod 24 will be at the same rate.

It will be observed that the water is being heated throughout the latter part only of the night. The time during which the heating is to take place has been so chosen that it is of minimum duration and finishes at the chosen time in the morning. There is, therefore, a minimum of time during which heat may be lost by radiation.

In Fig. 4 this is illustrated by the line 102 in the drawings, it having been assumed that the change in temperature from 70° to 110° has taken place in the time from 9 P. M. to 2 A. M. If the changes continue to occur at the same rate, the core 33 will have reached its lowest position at the time that the water has arrived at 150°, which is illustrated by the line 103 in Fig. 4.

It will be seen that a relation is established correlating the time elapsed, since the clock 52 closed its contacts, and a minimum temperature for the water. If the water be hotter (reach a temperature higher) than the temperature correlated to the moment being considered, no change in circuits occurs. Such higher temperature may, for convenience, be termed "the critical temperature."

During the night the water is cooling. The critical temperature, however, is rising. Normally, the two become equal at some time in the night. When this happens, contacts 57 and 60 close and the events recited in discussing line 101 occur, with the consequence that the heater 76 will begin to work.

Even if the water does not cool during the night, the critical temperature rises and at some time, it will become equal to or greater than the actual temperature of the water.

The change in the critical temperature with the time is not strictly proportional to the time elapsed since the contacts of the clock 52 first closed. During the first part of the period bar 30 rests on standard 62 and no actual temperature of the water, however cold, will cause contact 57 to touch contact 60, but from the time core 33 has descended far enough to make such touching depend on the temperature, all the control described will start and continue from then until the actual temperature of the water is below the critical temperature corresponding to the time. When the contacts 57 and 60 have closed, the locking circuit through contacts 70 is closed, and heating of the water, although it may result in opening contacts 57 and 60, will not deenergize magnet 65 or stop the heating.

When the rod 33 reaches the lowermost position, the contact 45 will have descended over the beveled end 49 of the device 46 and will have snapped into place against the contact 47. This will establish a shunt around the magnet 65, from one terminal of the magnet winding over wires 66 and 67 to contacts 47 and 45 and thence over wire 53 and contact 70 to the other terminal of the winding. This removes the resistance of magnet 65 from the circuit including solenoid 35 and deenergizes magnet 65. Contacts 70 and 74 then open.

The opening of contacts 70 removes the holding circuit for magnet 65 and it cannot again be energized until contact 57 again touches contact 60. The opening of contacts 74 removes power from the heater coil and no more heat is delivered to the water.

The shunt about magnet 65 causes the current through solenoid 35 to increase and the lifting power thereof becomes sufficient to elevate the core 33. When the core reaches the top of its movement hook 45 slips off of contact 47 and opens the circuit through solenoid 35 which is thus deenergized and core 33 again begins to descend.

The condition at 7 A. M. just before solenoid 35 began to lift the core 33 is represented by the line 103 on Fig. 4.

Shortly after 7 A. M. the clock 52 opens its contacts and thus opens the connection to the unit illustrated in Fig. 1, but at this time there is no current because the circuit of magnet 65 is open at contacts 70, at hook 45 and at plate 57, and the circuit of solenoid 35 is open at the same points. The opening of the contacts by the clock 52, therefore, is without sparking or other difficulty.

While conditions at the time the core 33 reached its lowest position are correctly represented by the line 103 in Fig. 4, and this position has been marked 7 A. M. to indicate this fact, the line 100, which is also marked 7 A. M., does not represent actual conditions at this hour. It represents the correlation between the time when the pivot 31 reached its highest position and a temperature that is marked 70°, but the temperature of the water is without effect on the control system as long as the bar 30 rests on the support 62. In the absence of such support the bar 30 could descend until contact plate 57 touches contact point 60 if the water cooled slightly below 70°.

The contacts 57 and 60 will not close again until either sufficient time has elapsed or the actual temperature of the water has sufficiently decreased. The decrease in actual temperature by ordinary cooling is unlikely to occur during the time after 7 A. M., the contacts of the clock 52 remain open. The decrease may, however, occur by the hot water being replaced in the tank by cold water. The temperature for each moment below which the temperature of the water must go to start the heater is indicated by the right-hand ends of lines drawn in Fig. 4. If this be like the line 100 the heating will not start even if the water is cooled below 70°, because the stop 62 will prevent the bar from lowering enough to make contact 57 touch contact 60.

Sometime soon after 7 A. M. it is assumed that the clock has closed the contacts of clock 52. An hour later, say, at 8 A. M., the pivot 31 has descended so far that, as shown by the line 101, if the water is as cool as 70°, heating will start. The operation throughout the day continues as indicated in Fig. 4; the pivot 31 descends and the bar 30 assumes a position corresponding to the lines in Fig. 4 provided the temperature of the water is as cool as that indicated at the right-hand end of the lines. If the water is cooler than this, the heating will start, provided the contacts of the clock 52 have remained closed.

A similar result caused by the descent of the pin 81 will be obtained by the cam 83 in the modification illustrated in Fig. 5. In the illustrated position of cam 83 the pin 81 contacts the part of the cam corresponding to 2 A. M. and the position of the bar 30 corresponds to lines 102 in Fig.

4. At that time, if the water is cooler than 110°, contacts 57 and 60 will be closed and magnet 65 energized over a circuit from main 50, contacts 57 and 60, magnet 65 and contacts controlled by clock 52 to main 51. Contacts 70 are thus closed and the magnet 65 rendered independent of contacts 57 and 60. Contacts 74 are also closed and the heating coil 76 is energized.

If, on the other hand, the water is hotter than 110° at 2 A. M. and has from 9 P. M. to 2 A. M. been hotter at each moment than the critical temperature correlated to that moment, contacts 57 and 60 will remain separated and will have been separated ever since the clock 52 closed its circuit at 9 P. M. and the heating will not be started. When the clock 52 closed its contacts, no circuit was established through magnet 65 because the pick-up circuit was open at 57—60 and the holding circuit is open at 70.

In the operation of the form illustrated in Fig. 5 it is also assumed that the contacts 52 will close at 9 P. M. and remain closed until approximately 7 o'clock the next morning. It is also assumed the cam 83 lifts the pin 81 highest at 9 P. M. Conditions at the time correspond to the line 100 in Fig. 4 although the line is marked 8 P. M. there. With the pin 81 at this height, the bar 30 rests on the stop 62 and regardless of how cold the water is, contact plate 57 does not touch contact 62. Heating, therefore, will not start no matter how cold the water is. As time goes by and the cam rotates clockwise, as shown in Fig. 5, the pin 81 will descend until conditions are as represented by line 101, Fig. 4. It is assumed that then, if the water is as cool as 70°, contact 57 will touch contact 60.

At or soon after 9 P. M., therefore, under the conditions assumed, a circuit will be established from main wire 50 over contacts 57 and 60 and wire 63 to the magnet 65 and then over contacts 52 to the other main wire 51. Magnet 65 being energized closes the contacts 70 and establishes a holding circuit for itself. It also closes the contacts 74 and establishes a heating circuit. Each of these two circuits are as described in connection with magnet 65 in Fig. 1. The line 101 is marked 9 P. M. on Fig. 4 and the pin 81 will descend enough to permit bar 30 to escape stop 62 and let plate 57 touch contact 60 at a time soon after 9 P. M.

The shape of the cam 83 is such that from 9 P. M. until 7 A. M. the pin 81 is descending at a steady rate. The position of the cross bar 24 needs, therefore, to rise at a steady, although different, rate to keep contacts 57 and 60 just separated. During the night, however, the water, although it may be cooling, is not heating. Therefore, at some time during the night the water will not be hot enough to lift the cross rod 24 as far as the statement just made requires. When this occurs contacts 57 and 60 will close and heating will be started as stated.

By 7 A. M. the critical temperature has risen to the maximum temperature that the water is expected to attain and the right-hand end of the bar 30 has been lifted by the cross bar 24 to its highest point. Conditions now are very nearly like those represented by line 103 in Fig. 4.

This is the highest point cross bar 24 ever attains; the pin 81 is, however, low enough at 7 A. M. to bring contact 57 down to contact 60 even with the cross rod 24 at its highest.

The resulting contact between plate 57 and point 60 energizes the magnet 65 now if it has not been energized before, but at this time the clock opens the contacts of clock 52.

The circuit opened by the contacts of clock 52 includes the magnet 65 but not the heater 76. The heater is in a circuit in parallel to the magnet 65 and to the motor 86 and it can be opened by the contacts 74.

The contacts 52 need be open only for a moment to open the contacts 70 and so open the holding circuit for magnet 65. They should continue open until the cam 83 has revolved beyond the 8 A. M. position and lifted contact 57 off the contact 60.

It is assumed that from 7 A. M. until the beginning of the time when the load upon the power system is again small, which is assumed to be 1 P. M., the contacts of clock 52 remain open. At 1 P. M. they are closed by the clock. During this same time the cam has been rotating and the pin 81 has been raised from its lowest position to a peak marked 1 P. M. but this peak is not as high as the peak marked 9 P. M. At 1 o'clock, therefore, a critical temperature is established which is higher than the 9 P. M. critical temperature.

The cam is so shaped that from 1 P. M. to about 4 P. M. the pin 81 descends. The cam has a valley at about 4 P. M. but not as deep as the 7 A. M. valley. Then the critical temperature increases through the afternoon but never gets high enough to equal or exceed the actual water temperature unless the water in the tank is replaced with cold water to greater than the usual amount. Provision is thus made for starting the heater when unusual quantities of hot water are withdrawn in the day time, but only then. At 4 P. M. the clock again opens the contacts of clock 52 and further heating is impossible. Opening the contacts of clock 52 opens a circuit which is in parallel with the heater 76 but the contacts are not in the circuit of the heater. The current interrupted by the contacts of clock 52 is, therefore, only the current needed for the relay 65 and no great degree of sparking will occur. From 4 P. M. until 9 P. M. the cam lifts the pin 81. The rate of this lifting is not important and the corresponding part of the cam may be any convenient shape. At 9 P. M. conditions are as first stated and the cycle is repeated.

During the time from 1 P. M. until 4 P. M. it is, therefore, possible to heat the water provided the customer has used enough of the hot water to call for additional heating. Most customers will not have used as much hot water during the period as just stated. Therefore only a small proportion of the heaters will be started during the afternoon and most of them having been started only just before 4 P. M. will be working for only a short time. The heating load added to the other day time load will therefore never be large and consequently it will probably never increase the total peak load created jointly by the heaters and other load.

Various adjustments have been indicated in the foregoing descriptions. Part of these adjustments may be performed at the factory when the apparatus is first assembled and part of them may best be performed when the apparatus is in place in the heating system.

The core 37 of Fig. 1 is disconnected from the timing device 41 or the cam 83 of Fig. 5 is disconnected from the shaft 84 in order that the adjustments about to be described may be performed without loss of time. The plunger or the cam are moved to position corresponding to 2

A. M., the temperature of the water is then brought to 110° and the screw 17 is adjusted until the plate 57 just comes into contact with the point 60. The cam or plunger is then brought to a position corresponding to 4:30 A. M. and the temperature of the water is brought to 130° and the cross rod 24 is then moved along the slots 20 until it touches the bar 30 but does not lift it enough to remove the plate 57 from the point 60. When these adjustments have been made the time device 41 is again connected to the plunger or the shaft is again connected to the cam 83. These connections are made by moving the plunger or cam to the position corresponding to the time at the moment, but without changing either the cross rod or the screw 17.

It is to be understood that the temperature and times of day mentioned are intended only to illustrate the method. Other times and temperatures may be used and different shapes given to the cam accordingly. Other power companies will offer different terms to their customers and the shape of the cam 83 may be designed to take advantage of such terms.

If, for example, a different schedule is wanted in summer from in winter, the shape of cam 83 and the times for the clock to operate contacts of clock 52 may be changed at appointed dates. Generally, however, this is not a desirable procedure but the adjustment for winter conditions is permanently retained. As summer approaches the later afternoon heating load will not interfere with the lighting load because darkness does not come until later. Also, the night time heating load will not become very large until later in the early morning hours for the water in the tanks will cool more slowly during the summer time.

Again, it may be desirable to use a different time for turning on the heating load in the congested part of a city from the time used in the residential part. This is easily provided for by a mere changing of the cam 83 when a unit is moved from one location to another.

When a cam as illustrated in Fig. 5, is used and the clock 52 closes its contacts early in the afternoon, an undesirable addition to the load which is already heavy is avoided by the circumstance that not all of the water heating units are turned on at once. Only those which have had the hot water used up to the point where the water remaining is cool draw power when the clock 52 closes its contacts. The others will draw power only when the water in their tanks becomes so cool that it must be reheated. This may not happen to all tanks.

This system is adapted to be added to heating apparatus already in use and features of such apparatus may be added thereto without invention. For example, a thermostat responsive to excessive temperatures may be included to prevent dangerous over-heating. The limit established by such safety devices ordinarily will be above the maximum temperature this system is intended to fix, though it may be below without departing from the spirit of the invention.

It will be evident to those skilled in the art that many modifications in detail beside those specifically illustrated and described are possible. I, therefore, do not desire to be limited except by the limitations expressly stated in the claims.

I claim as my invention:

1. In a water heating system, a heater, a device responsive to the temperature of the water, an elapsed-time device, a contact at times controlled by the mutually dependent action of the two, a time-of-day mechanism, a contact controlled thereby and means for turning on power to the heater controlled by both contacts, whereby said elapsed-time device is ineffective to control said means unless said responsive device occupies a certain position relative to said elapsed time device.

2. In a water heating system, a heater, a source of power, a circuit, a time-of-day device connecting said source to said circuit at a predetermined time, a device responsive to the temperature of the water, a device acting in accordance with the time elapsed since said predetermined time, said temperature device and said elapsed-time device jointly controlling said circuit to determine its action when connected to said source and a connection from said source to said heater controlled by said circuit.

3. In a water heating system, a heater, a source of power, a relay, a time-of-day device, connecting means cooperating with said device for connecting said relay to said source at a predetermined time, said connecting means temporarily including a contact separated from said time-of-day device, a device controlled by the time elapsed since said predetermined time, a device responsive to the temperature of the water, said contact being jointly controlled by said elapsed-time device and said temperature responsive device and said relay controlling the heater.

4. In a control device for a water heating system, a bar, a device controlling the elevation of only one end of the bar in accordance with the temperature of the water, a device controlling the rate of descent of the other end of the bar, and means for adjusting in a plane at substantially right angles to the plane of movement of either end of the bar the point at which the first named end is connected to its control device, whereby the ratio of the rate of change of elevation of the other end to the rate of change of temperature of the water may be controlled.

5. In a control device for a water heating system, a bar, a device controlling the elevation of only one end of the bar in accordance with the temperature of the water, a device controlling the rate of descent of the other end of the bar, and means for adjusting the point at which the first-named end is connected to its control device whereby the ratio of the rate of change of elevation of said other end to the rate of change of temperature of the water may be controlled, a contact at an intervening point of the bar, a stationary contact cooperating therewith, whereby a minimum temperature will be correlated to each moment of time elapsed since the second-named end began its descent, above which temperature the contacts will be separated.

6. In a control device, a clock, a circuit controlled by said clock, an elapsed-time device, contacts controlled thereby and closed when a predetermined time elapses after the circuit is closed by said clock, a magnet in said circuit, connections controlled by said contacts for short-circuiting said magnet, and a solenoid forming part of the elapsed-time device in series with said magnet and effective to operate the elapsed-time device and separate said contacts only if said magnet is short circuited.

7. In a control device, a clock, a circuit controlled by said clock, an elapsed-time device, contacts controlled thereby and closed when a predetermined time elapses after the circuit is closed by said clock, a magnet in said circuit, connections controlled by said contacts for short-circuiting said magnet, a solenoid forming part of the elapsed-time device in series with said magnet and effective to operate the elapsed-time device and separate said contacts only if said magnet is short circuited, a second pair of contacts in series with said magnet and with the solenoid, and a holding circuit for said magnet whereby once energized it is independent of said second contacts.

8. In a water heating system, a device responsive to the temperature of the water, an elapsed-time device, a contact controlled by the joint action of the two, a time-of-day mechanism, a contact controlled thereby, a heater, means controlled by both contacts for turning on power to the heater, and a stop, active when the elapsed-time device is near the beginning of its movement and preventing the temperature of the water having any effect upon said joint action when below a fixed minimum.

9. In a fluid-heating system, the combination with a container for the fluid, and controllable means for imparting heat to said fluid, of first means responsive to elapsed time, second means responsive to the temperature of said fluid means for daily rendering said heat-imparting means ineffective for a predetermined period at a preselected time of day, and said first and second means coacting with each other for rendering said heat-imparting means effective at the latest time preceding said preselected time that will be effective to raise the temperature of the fluid to a predetermined value at said preselected time.

10. In a fluid-heating system, the combination with a container for the fluid, and controllable means for imparting heat to said fluid, of first means responsive to the temperature of the fluid, a time mechanism, second means responsive to said time mechanism tending to make said heat-imparting means active, said first means adapted at times to restrain such tendency, and means for daily rendering said responsive means ineffective to make said heat-imparting means active for a predetermined period at a preselected time of day, said restraint becoming ineffective and said second means thereupon rendering said heat-imparting means effective at the latest time preceding said preselected time that will be effective to raise the temperature of the fluid to a predetermined value at said preselected time.

11. In a fluid-heating system, the combination with a container for the fluid, and controllable means for imparting heat to said fluid, of first means responsive to the temperature of the fluid, a time mechanism, second means responsive to said time mechanism cooperating with said first responsive means and tending to make said heat-imparting means active, said first means adapted at times to delay such tendency, and means operative at a preselected time for daily rendering both said responsive means ineffective for a predetermined period and for later rendering both said responsive means effective to make said heat imparting means active at the latest time preceding said preselected time that will be effective to raise the temperature of the fluid to a predetermined value at said preselected time.

12. In an off-peak type heater effective for heating tap water for residences during a period of each day when the demands for electrical energy and its cost to the consumer are reduced, the combination of a container for the water, means for heating the water in the container, means responsive to time for moving a control member starting at approximately the beginning of said reduced-cost period, means responsive to the temperature of the water to be heated for moving a second control member, and means responsive to the conjoint action of the two control members for energizing the heating means during the last portion of the reduced-cost period, the time of such energization increasing with increases in the requirements imposed upon the heater and vice versa.

13. In apparatus for heating tap water for residences and adapted for connection to a power source that is subjected to high current demands during a peak period of the day and to relatively low current demands during an off-peak period of the day, the combination of a container for water, an electrical heater associated therewith, an electrical circuit connecting the heater and said power source, switching means controlling the circuit, timing means for closing the switching means during the off-peak period of the day and for opening the switching means at the termination of the off-peak period of the day, and thermostatic means responsive to the temperature of the water being heated for adjusting the timing means so that it effects closing of the switching means early in said off-peak period when the temperature of the water is relatively low and late in the off-peak period when the temperature of the water is relatively high.

14. In apparatus for heating tap water for residences, the combination of a container for the water, means for heating the water in the container, timing means for conditioning the heating means so that it may be energized during a selected period of the day and for rendering the heating means inactive during the remainder of the day, and means responsive to the temperature of the heated water for adjusting the timing means so that energization of the heating means is effected early in said selected period of the day when the temperature of the water is relatively low and late in said selected period of the day when the temperature of the water is relatively high, said timing means effecting deenergization of the heating means at the termination of said selected period of the day.

JOHN K. OSTRANDER.